United States Patent [19]
Adiletta

[11] Patent Number: 5,366,631
[45] Date of Patent: Nov. 22, 1994

[54] COMPOSITE, SUPPORTED FLUOROCARBON MEDIA

[75] Inventor: Joseph G. Adiletta, Thompson, Conn.

[73] Assignee: Pall Corporation, Glen Cove, N.Y.

[21] Appl. No.: 833,122

[22] Filed: Feb. 10, 1992

[51] Int. Cl.⁵ ............................................. B01D 71/32
[52] U.S. Cl. .................................. 210/651; 210/490; 210/500.36
[58] Field of Search ............. 210/638, 500.36, 500.21, 210/490, 493.2, 507, 503, 505, 651; 204/128, 282; 156/324

[56] References Cited

U.S. PATENT DOCUMENTS

| | | |
|---|---|---|
| 3,953,566 | 4/1976 | Gore . |
| 4,025,679 | 5/1977 | Denny ........................... 210/507 X |
| 4,187,390 | 2/1980 | Gore . |
| 4,203,847 | 5/1980 | Grandine . |
| 4,203,848 | 5/1980 | Grandine . |
| 4,399,183 | 8/1983 | Withers ........................... 210/638 X |
| 4,431,545 | 2/1984 | Pall et al. . |
| 4,664,683 | 5/1987 | Degen et al. . |
| 4,716,074 | 12/1987 | Hurley et al. . |
| 4,743,349 | 5/1988 | Bachot et al. ................... 204/294 X |
| 4,774,001 | 9/1988 | Degen et al. . |

FOREIGN PATENT DOCUMENTS

| | | |
|---|---|---|
| 0185373 | 6/1986 | European Pat. Off. . |
| 0398508 | 11/1990 | European Pat. Off. . |
| 9006337 | 6/1990 | WIPO . |

*Primary Examiner*—Frank Spear
*Attorney, Agent, or Firm*—Leydig, Voit & Mayer

[57] ABSTRACT

A composite, supported microporous medium is provided which includes a fluoropolymeric microporous membrane having secured directly to at least one surface thereof a fluoropolymeric web of microfibers. A method of forming a composite, supported microporous medium is also provided which includes contacting a fluoropolymeric microporous membrane with a fluoropolymeric web of microfibers and subjecting said fluoropolymeric membrane and web of microfibers to sufficient heat and pressure to effect bonding therebetween. The composite, supported microporous medium may be employed for separation of a particulate material from a particulate-containing fluid. The composite medium also finds use in analytical procedures.

37 Claims, 1 Drawing Sheet

COMPOSITE, SUPPORTED FLUOROCARBON MEDIA

TECHNICAL FIELD

This invention relates to porous fluoropolymer media and, more particularly, to composite, supported microporous fluoropolymer media which are useful in filtration and analytical applications. The present invention also contemplates processes for preparing and using such media.

BACKGROUND OF THE INVENTION

Many analytical and filtration applications that involve gaseous or liquid fluids require the use of chemically inert media which are capable of removing particles in the micron and submicron ranges. Microporous media employed for such purposes are typically relatively delicate structures which are not capable of holding a fixed shape and which are also easily damaged. For example, U.S. Pat. No. 4,431,545 describes a hydrophilic, microporous filter system having ultrafiltration capability, i.e., the ability to remove particles as fine as about 0.001 to about $10\mu$. A preferred filter medium for use in the system described in U.S. Pat. No. 4,431,545 is a thin (typically, only a few mils thick) microporous polyamide membrane. This membrane is difficult to work with because of its limited strength and its lack of internal rigidity.

Some of the most chemically inert materials available for use as microporous membranes include those polymeric materials known as Teflon ®. This term represents fluorocarbon resins such as polyperfluorinated olefins formed from monomers containing 2 and 3 carbon atoms, such as polymers formed from tetrafluoroethylene (TFE), fluorinated ethylene-propylene (FEP) and copolymers thereof. It is the chemical inertness of these materials which makes them desirable for analytical and many filtration applications. In addition, polytetrafluoroethylene (PTFE) membranes provide the desirable properties, when used for analytical purposes, of generally having a white background and being translucent when wet. In the forms suitable for use as filtration or analytical media, microporous membranes of PTFE are thin, relatively delicate structures with little internal rigidity, having very low flexural moduli. That is, they do not retain their shape when unsupported, typically hanging limply in loose folds, much as a piece of thin cloth drapes when unsupported. These drawbacks create difficulties in working with such membranes. Thus, corrugating such media to increase the surface area available in a filter element or even using as simple planar filters subjects such media to easily being torn or, because of static electrical charges, to adhering to itself. The lack of commercial availability of PTFE membranes in the form of flat disks of thin, fine pored media, a highly desirable filtration material for many applications, provides an additional indication of the difficulty of handling and working with such delicate materials. Besides having a low flexural modulus and limited strength, PTFE and similar membrane materials tend to become electrostatically charged. Such a material sticks to itself and makes it difficult to maintain in a flat or planar disk form. Furthermore, because of the low flexural modulus and the difficulty in sealing PTFE membranes to support materials, such as polypropylene housings, it is difficult to manufacture filter structures which incorporate this type of membrane in such housing. For example, in biomedical applications particularly, it is frequently desirable to insert a precut flat or planar filter piece into a preformed support structure and to tightly seal the periphery of the filter piece to the support structure. Unsupported PTFE, because of its low flexural modulus, cannot be readily used in such a manner, since accurate placement becomes difficult as does sealing the membrane to the support structure.

Currently, available from Pallflex Products Corporation is a supported PTFE membrane. The PTFE membrane is mounted on an annular polyolefin or polyester frame member which serves to prevent significant flexing of the membrane. The outer and inner diameters of the frame member are 47 and 37 mm, respectively. While such an arrangement is effective for PTFE membranes of about this size, it is not particularly effective for larger PTFE membranes or for non-circular shapes.

Finding suitable materials and structures to support the flimsy films of Teflon ® has presented some difficulties. Thus, because of its chemical inertness, Teflon ® does not easily adhere to other materials even when heat-bonding is attempted. In addition, in certain analytical procedures, including analyses where translucent Teflon ® is critical, the presence of any sort of non-Teflon ® material, such as a material used as an adhesive, potentially introduces a foreign contaminant, due either to leaching or to degradation. Such contamination frequently adversely affects those media used in analysis. This tends to be particularly true when materials such as polypropylene are used.

To provide suitable strength and greater rigidity, an approach used with other polymeric membranes having similar structural and physical properties has been to incorporate a substrate, such as a fibrous web or mat, permanently into the membrane structure. This both enhances the strength and the flexural modulus of the membrane. While such internally supported membranes are more easily handled and resist tearing, which would be disastrous for a filtration material in most applications, the shortcoming of such media is their greater resistance to fluid flow. That is, such materials frequently show a several fold increase in pressure drop across a membrane compared to unsupported membranes. In addition, some of the materials used for the supporting web may contribute to a reduced chemical compatibility; that is, the medium may have insufficient chemical or physical resistance to chemical reagents, solvents and the like.

Currently, many filtration procedures are also limited by the physical properties, other than those discussed above, of the filtration media employed. For example, many of the currently used filtration media cannot be used in high temperature applications because the materials show a tendency to either pyrolyze, otherwise decompose, sinter or fuse. Were a medium to exist which overcame the aforementioned problems and could also be used in applications which require higher temperatures, the additional versatility would result in much greater commercial utility of such a medium.

SUMMARY OF THE INVENTION

The present invention is directed to composite, supported, microporous media formed from fluoropolymers, preferably substantially completely or completely formed from polyperfluoroolefins. (As used herein, the terms "fluoropolymer", "fluoropolymeric", and like terms refer to polymers formed from fluorocarbons.) Particularly preferred are fluorocarbon resins such as those formed from tetrafluoroethylene (TFE), hexafluoropropylene (HFP), fluorinated ethylene-propylene (FEP) resins and copolymers of the aforementioned. These materials are generally categorized as Teflon ®. Most preferred are media completely formed from PTFE or from PTFE and FEP. Accordingly, the media of the present invention may be used in filtration as well as in analytical applications where both chemical and particulate contamination must be kept to a minimum and where a chemically inert material is important. In addition, the media of the present invention show a higher flexural modulus as well as burst and tensile strength relative to comparable unsupported media, while retaining a relatively low pressure drop across the media. The media of the present invention, particularly when formed from polyperfluorinated polymers, and especially those which include substantial concentrations of PTFE, may also be used in applications requiring higher temperatures than have been used with many other organic media.

The aforementioned advantages over known supported membranes are attained by the present invention in which a web of fluoropolymeric microfibers is secured to a fluoropolymeric microporous membrane. The composite, supported microporous membrane is free of any adhesive components, the membrane being secured to the web solely at the interfaces of the membrane and the web.

Many of the features of the present invention are achieved by virtue of a composite, supported microporous medium which includes a fluoropolymeric microporous membrane, typically non-fibrous, secured directly to a fluoropolymeric web of microfibers.

The composite, supported microporous membrane of the present invention may be manufactured by a method which includes contacting a fluoropolymeric microporous membrane with a fluoropolymeric web of microfibers and applying heat and pressure in amounts sufficient to bond the web of microfibers to the microporous membrane. Typically, the web of microfibers will include a microfibrous mat formed from a fluorocarbon resin as well as a binder formed from a fluorocarbon resin.

The composite microporous media or membranes of the present invention may be used for both filtration and analytical media. When used as a filtration medium, it may be used to separate particles from a particulate-containing fluid. The fluids may be either liquid or gaseous. The media of the present invention are expected to have significant application to air quality monitoring systems. In such filtration methods, a particulate-containing fluid contacts a surface of the composite forming the microporous membrane of the present invention, thereby separating the particulate material from the fluid and producing a substantially particulate-free filtrate. In the analytical method employing the composite microporous membrane of the present invention, an analyte-containing fluid, which is typically a particulate, analyte-containing fluid, is treated by contact with a surface of the composite, supported microporous medium of the present invention, thereby forming a substantially particulate-free filtrate while retaining the analyte. The latter is subsequently tested directly on the membrane or dissolved and removed for further testing.

DESCRIPTION OF THE PREFERRED EMBODIMENTS

Composite Microporous Media

Figure 1:
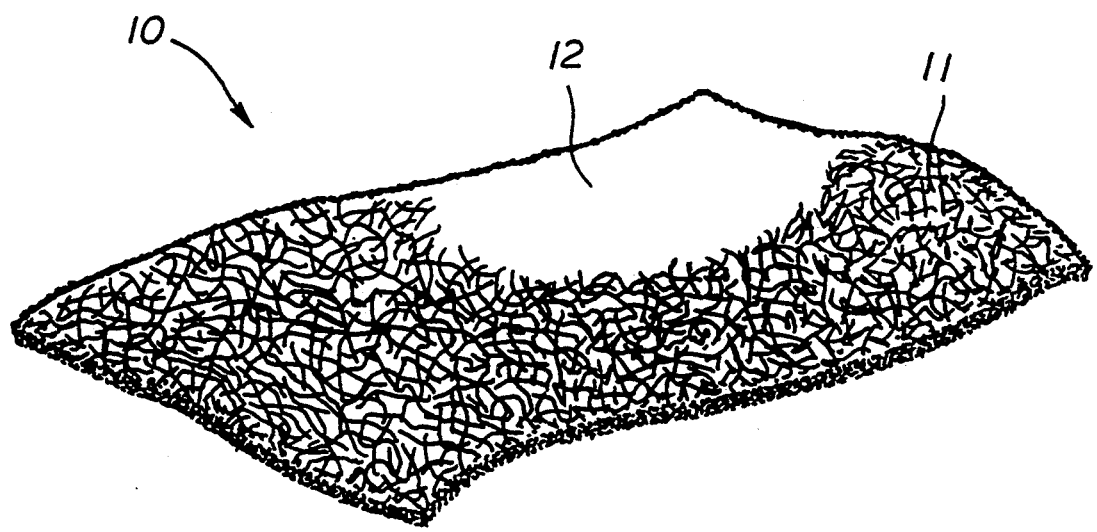
FIG. 1 is a perspective view with a partial cut away of a swatch of a medium of the present invention.
Figures 2, 3:
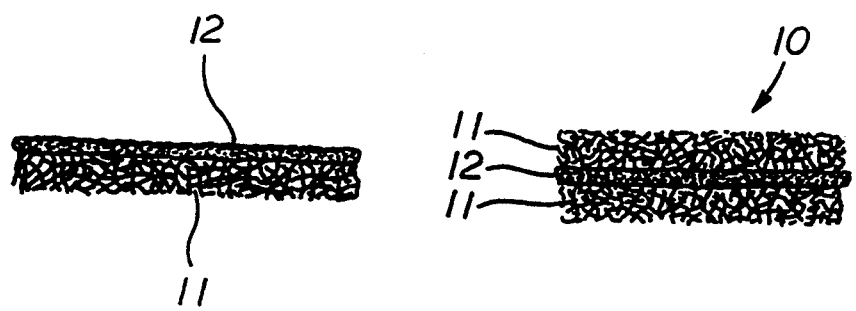
FIG. 2 is a cross-sectional view of an embodiment of the present invention in which a web of microfibers is adhered to one surface of a microporous membrane.
FIG. 3 is a cross-sectional view of an embodiment of the present invention in which a microfibrous web is bonded to opposite surfaces of a microporous membrane.

The composite microporous media of the present invention, or the membranes formed therefrom, demonstrate chemical resistance, high temperature resistance and strength, high efficiency and a low pressure drop. They are also quite easy to handle without tearing or showing a tendency to fold or stick to themselves. The composite, supported microporous media and membranes of the present invention are produced in a process which includes the step of securing or bonding a fluoropolymeric web of microfibers directly to at least one surface of a fluoropolymeric microporous membrane. Both the membrane and microfibrous web are available commercially from Pall Corporation. To effect adequate bonding between the web of microfibers and the microporous membrane, the web and membrane are placed in contact with one another and subjected to sufficient heat and pressure to cause bonding between the component layers. The formation of the composite microporous media may be accomplished by a "batch" or, preferably, continuous process. The composite structure may include one microfibrous web adhered to one surface of the microporous membrane or two webs secured to opposite surfaces of the microporous membrane in a sandwich arrangement.

In the process of forming the media, the fluoropolymeric web(s) and microporous membrane are sufficiently heated and pressure applied to cause the microfibrous web to be adequately secured or bonded to the microporous membrane. While various combinations of temperature and pressure may be employed, the intention is to supply enough heat to the composite medium to reach the "fusing temperature" of the fluoropolymeric material. At this point, the fluoropolymeric material has just begun to soften and become tacky. Above this temperature, many of the materials begin to change dimensions, flow or assume fluid-like characteristics, sinter or even decompose. Any of these transformations are generally undesirable but are particularly undesirable in the preferred embodiment employing the above-described perfluorinated polyolefins. To assure the microfibrous web being adequately secured or bonded to the microporous membrane, the proper amount of both heat and pressure must be selected. The amount of heat to achieve adequate bonding but to avoid the adverse transformations indicated above is influenced by a number of factors. First, the nature of the material itself contributes to the particular temperature or range of temperatures that correspond to the fusing temperature. In addition, the mass of the membrane and web and, to a degree, the diameters of the fibers determines the amount of heat which should be supplied as does the temperature of the heating zone and the duration of time spent by the membrane and web in the heating zone. All other things being equal, the amount of heat required to just reach the fusing temperature will be directly proportional to the mass of fluoropolymeric material being heated. In addition, to reach but not exceed the fusing temperature of the lowest "melting" fluoropolymeric material used, the temperature and duration of heating may be varied inversely. Finally, the amount of heat supplied will also vary depending on the materials used for the microporous membrane and microfibrous web. That is, if chemically dissimilar materials are selected for the microfibers and the microporous membranes, some minimum of experimentation may be required to determine the best temperature. By "chemically dissimilar materials" is meant two different types of fluoropolymeric materials or those fluoropolymeric materials having different types of functional groups or atoms. It is generally preferred from both the perspective of selecting processing conditions, as well as the nature of the bonding process, to select the same material for use as the microporous membrane and the microfibers used to form the mat. Preferably this material is a polyperfluorinated material such as a Teflon® material and particularly PTFE.

When both the microporous membrane and the microfibrous web are formed from Teflon®, a suitable range for the fusing temperature selected is about 400° to about 700° F. Preferably, the temperature employed is in the range of about 450° to about 550° F. with the most preferred temperature being about 475° F. In those embodiments in which a composite medium is formed from a microporous membrane sandwiched between two webs, a slightly higher temperature, on the order of about 5 to 10%, may be employed.

The amount of pressure employed in the process of securing the microfibrous web to the microporous membrane must be sufficient to facilitate securing the web to the membrane material but not sufficient to cause an undue amount of compression of the web which results in a significant increase in the pressure drop across the composite membrane. For the preferred composite medium formed from Teflon® and particularly substantially from PTFE, a suitable pressure is about b 5 to about 80 lbs/in$^2$ (about 3500 to about 56300 kg/m$^2$). Preferably the pressure is about 40 to about 60 lbs/in$^2$ (about 28100 to about 42200 kg/m$^2$).

The preferred method of securing the microfibrous web to the microporous membrane is a continuous process and involves placing the web in contact with the microporous membrane and passing the assembled composite material between a pair of rollers. When a web of microfibers is adhered to only one of the surfaces of the microporous membrane, preferably, one of the rollers is formed from rubber while the other roller is metal. In this embodiment, it is preferred that the rollers be so arranged that the rubber contacts the microporous membrane. Examples of the rubber employed include natural and synthetic rubbers such as silicone rubber, EDPM, Hypalon® and Viton. While any metal which conducts heat well and does not stick to the web or membrane may be employed, stainless steel is preferred. Preferably a heated metal roller is used such that both pressure and the desired amount of heat may be imparted to the composite structure that passes between the rollers.

When forming the embodiment of the present invention in which a microfibrous web is bonded or secured to both surfaces of the microporous membrane, in the preferred continuous process, the web may be applied to each surface of the membrane successively or simultaneously. Whereas the combination of a rubber roller placed adjacent a metal roller, between which the web(s) and membranes may be passed may be used to form either embodiment of the present invention, this roller arrangement is preferred when a web is to be secured to only a single surface of the microporous membrane or in at least the first step when webs are to be secured to the membrane in successive, continuous steps. Two metal rollers placed proximate one another may also be employed to prepare the various embodiments of the present invention. This combination is preferred, however, when the embodiment in which webs are to be secured to both surfaces of the membrane are prepared.

In a continuous process of preparing the media of the present invention, it is preferred that continuous rolls of microporous membrane and microfibrous web be employed. The feed of these materials is preferably arranged so that the web and the membrane are in close proximity immediately before they contact one another. In the embodiment of assembling the membrane sandwiched between two webs, it is preferred that each web contact the membrane substantially simultaneously and pass between the same pair of rollers.

While it is preferred to contact the microporous membrane simultaneously with webs at both surfaces of the microporous membrane when the sandwich embodiment is formed, the two webs may be applied to and secured to the membrane successively. However, in such a situation, pressure would be applied first to the two-component composite structure formed from a single layer each of membrane and web and thereafter applied to the three-component sandwich structure (i.e., the two component medium and the second web). Accordingly, pressure must be carefully controlled such that the microfibrous web which is applied first to the microporous membrane is not, in the final composite structure, compressed significantly more than the microporous web applied thereafter unless this is the object sought. That is, during the first pass of the two components, the pressure and temperature must be so selected that the web is sufficiently bonded to the membrane but compression is minimized, taking into account that the web will be again compressed when a second web contacts and is adhered to the opposite surface of the membrane in preparing the three-component medium. Otherwise, the web which was secured to the membrane first will be overly compressed and the pressure drop across the medium will increase significantly.

Although the above discussion is directed primarily to preferred methods of forming the embodiments of the present invention, other techniques and apparatus may be employed. For example, rather than employing two rollers in a continuous process, a press arrangement, such as a platen press, may be employed to form the medium in a step-wise process. Again, the same types of materials, (i.e. rubber and metal) may be used to form the surfaces of the press which contact the microporous membrane and microfibrous web. In addition, while heat and pressure are preferably applied simultaneously to the web and membrane, these may be introduced in separate steps with the heat preferably being applied first.

The flexural modulus of the media of the present invention is, in part, determined by the amount of the microfibrous material laid down on the microporous membrane. For some applications, only a minimum thickness of the microfibers is desired since an absolute minimum increase in pressure drop is generally desired and only minimal increase in flexural modulus is required. This type of structure is useful where the primary concern is the sealing of the microporous membrane to a support structure. More typically, the amount of microfibers laid down on the microporous membrane will be such as to provide a thickness of the supporting web of microfibers as much as about fifteen times or more the thickness of the microporous membrane itself, typically ranging from about five to about fifteen times the thickness of the membrane. If a substantial quantity of microfibers is laid down, the resulting composite may be sufficiently rigid or board-like to enable it to be used as a filter medium capable of bridging relatively large spans without auxiliary support. Typically, the weight or amount of microfibers secured to the microporous membrane per square foot is in the range of from about 0.2 to about 10 grams.

While it is possible to achieve higher flexural moduli and, hence, higher rigidity by thickening the microporous membrane, such thickening is, for many applications, undesirable because it increases pressure drop and, in most cases, also increases cost.

The composite structures in accordance with the invention can be tailored to form a range of products with varying desirable properties. For example, if it is desired to minimize any increase in pressure drop resulting from adhering the microfibrous web to the membrane, a very thin layer of fibers can be secured to the membrane. The resulting composite structure will have essentially no increase in pressure drop and a limited increase in flexural modulus. However, it will be much more readily secured to a typical filter support structure.

Conversely, if a relatively thick layer of microfibers is secured to the membrane, the web of microfibers can function as a prefilter in liquid filtering applications to avoid early loading of the relatively fine microporous membrane, thereby increasing filter life.

Composite structures in accordance with this invention may also find application as insulation structures, particularly for clothing. By judicious selection of the microporous membrane and the amount of microfibers secured to the membrane, a desirable insulating structure can be achieved.

The composite structures in accordance with the subject invention which can be formed without the use of added adhesive components have the added advantage of being substantially free of media migration which can occur when adhesives are used in filter media. This advantage is important in many applications such as the filtration of water supplied for critical applications in industry and the medical field, e.g., microelectronics manufacture and water used for injection into humans.

Microporous Membranes

Materials suitable for use as the microporous membrane include fluoropolymers, preferably polyfluoroolefins, such as polyvinylidene difluoride (PVDF) and polyvinyl fluoride, and most preferably perfluorinated polyolefins, such as those formed from monomers having 2 to 5 carbon atoms, and preferably those monomers having 2 or 3 carbon atoms. These polymers may be either homopolymers or copolymers. Examples of preferred fluorocarbon resins include Teflon ® polymers, such as those formed from PTFE and FEP; and copolymers thereof. Most preferred is PTFE.

In most instances, a non-woven membrane is employed as the microporous membrane. The pore sizes of the microporous membrane employed will depend, to an extent, on the purpose for which the medium is being used. Typically, suitable materials have pore sizes in the microporous range extending from less than about 0.001 to about $10\mu$ or more. Preferably, the pore sizes will range from about 0.05 to about $5\mu$, most preferably about 0.4 to about $5\mu$. For air sampling the most preferred pore dimensions are about $2\mu$ and smaller pore sizes are preferred when the media is employed as a filter.

The thickness of the membrane employed in the present invention suitably ranges from about 0.0013 to about 0.0025 in (about 33 to about $63.5\mu$). These membranes may also be characterized as unskinned membranes, having generally uniform pore dimensions from one surface to the other. Exemplary of suitable PVDF membranes which may be used include the type disclosed in U.S. Pat. Nos. 4,203,847 and 4,203,848, and of the suitable PTFE membranes those generally described in U.S. Pat. Nos. 3,953,566 and 4,187,390 may be employed. All of the aforementioned U.S. patents are specifically incorporated herein. Many of these materials are available from Pall Corporation.

Polymeric Web of Microfibers

The fibers which form the non-woven mat of the composite media of the present invention are formed from the same materials which are suitable and preferred for use as the microporous membrane. These include fluoropolymers, preferably polyfluoroolefins and most preferably perfluorinated polyolefins. Examples of such materials include polyvinylidene difluoride (PVDF), polyvinyl fluoride, and Teflon ® materials such as homopolymers and copolymers of TFE and FEP.

The dimensions of the fibers, particularly their diameters, determine in part the pore characteristics of the web in the resulting composite medium. Accordingly, the diameters of fibers used in the present invention are suitably about 4 to about 10 denier. Preferably the fibers have diameters of about 6 to about 8 denier, most preferably about 7 denier. The selection of fiber diameter will depend in part on the application for which the supported membrane is intended.

The lengths of the fibers suitable for the webs of the present invention suitably range from about 2 to 100 mm. Preferably the lengths of the fibers are about 7 to about 35 mm. When assembled as webs, or mats, the microporous fibers have weights suitably from about 1.0 to about 10.0 grams/ft$^2$ (about 10.8 to about 108.0 grams/m$^2$), preferably about 2.5 to about 8.5 grams/ft$^2$ (about 26.9 to about 91.5 grams/m$^2$), most preferably about 3.5 to about 4 grams/ft$^2$ (about 37.7 to about 43.1 grams/m$^2$).

As indicated above, a conventional paper-making process may be employed to prepare the web of microfibers used in the present invention. A suitable process is described in U.S. Pat. No. 4,716,074, incorporated herein by reference. Typically, the process involves the steps of:

(a) preparing a stabilized dispersion of fluoropolymer fibers, a stabilizing agent and a liquid carrier;
(b) laying down the dispersion on a support and removing at least a portion of the liquid carrier;

(c) applying an emulsion of a fluorocarbon binder to the fiber lay down; and (d) curing the fluorocarbon binder.

It is preferred that the same material used to stabilize the dispersion of fibers serve as the fluorocarbon polymer binder. Materials which are suitable for use as the fluorocarbon polymer binders include those materials mentioned above as being suitable for use as the materials from which the microporous membrane and microfibers are formed. The preferred fluorocarbon polymer binders, particularly when the fibers are formed from the preferred polyperfluorinated olefin, PTFE, include fluorinated ethylene-propylene copolymers, particularly copolymers of TFE and HFP, such as FEP resin.

Suitably, the amount of fluorocarbon binder is about 10% to about 100%, by weight, based on the total weight of fibers employed. Preferably, the amount of fluorocarbon binder is about 25% to about 50%, by weight, based on the weight of fibers.

Use of the preferred PTFE fibers to form the mat in combination with the preferred FEP fluorocarbon binder, provides a web of fibers bonded at point to point contact to one another. The web has some thermoplastic character not demonstrated by the PTFE fibers per se. It is this thermoplastic character which assists in bonding the web to the microporous membrane upon the application of heat and pressure.

EXAMPLES

Test Methods

Air resistance measurements

A Gurley Densometer, which is generally employed to determine porosity and air-permeability, was used to measure the air flow rate through a small, critical area. Results are reported in terms of the number of seconds required for the volume of 100cm$^3$ of air to pass through an area of 1in$^2$ of the material being tested.

Tensile strength tests

Unlike metals which frequently fracture or rupture upon the application of a fixed force or stress, plastic films tend to show significant stretch prior to rupture. Because deformation beyond 3 to 5% will generally cause degradation in performance before rupture, a 3% elongation is a critical measurement. Both the tensile strength measurements and the burst strength measurements reported in Tables 1 and 2, respectively, were performed according to ASTM approved methods. Burst strength was measured in lbs/in$^2$ using the Mullen hydraulic method.

Example 1(a)

Preparation of a Composite, Supported Microporous Medium Using a Single Web

A 30 cm wide strip of PTFE membrane having a thickness of 0.0018 in. (46μ) and an average pore diameter of 0.3μ was supplied from a continuous roll. A non-woven web formed from PTFE fibers and a FEP fluorocarbon polymer binder, having a width of 30 cm, was supplied as a continuous strip from a roll placed below and in contact with the roll of the PTFE membrane. The fibers had an average diameter of 7 denier and an average length of 6 mm. The ends of the web and membrane strips were threaded over support idler rollers to the nip of hot calendar or laminating rolls. The PTFE membrane had a thickness of about 0.002 in. (51μ) and the Teflon ® web had a thickness of about 0.005 in. (130μ). The temperature of the calendaring rolls was set at 550° F. The roll which the web contacted was chrome plated while that which the membrane contacted was formed from rubber. The pressure was increased slowly to and then held at 50 lbs/in$^2$ as the laminated web was drawn onto the wind up roll with a minimum amount of tension to avoid distorting the micropores. A web tension of 150 gm/in width was used. Cooling of the composite microporous structure to ambient temperature allowed the medium to "set" and de-stress the lamination.

Example 1(b)

Preparation of a Composite Supported Microporous Medium Using Two Webs

In preparing a "sandwich" composite medium in which a microfibrous web is adhered to both surfaces of a microporous membrane, the same materials, apparatus and technique were used except for slight differences. In particular, a second roll of microfibrous web was used to supply the non-woven web to the upper surface of the membrane. For lamination, in place of one rubber and one metal roll, two metal rolls were employed and all three components were passed between the metal rolls. The rolls were set at a temperature of 590° F. but the same pressure was used as in Example 1(a).

Example 2

Comparison of Properties of Teflon ® Media

Tests were performed on both a PTFE microporous membrane (and on 5 other media corresponding to the present invention which were prepared by methods such as those described in Examples 1(a) and 1(b)). The results are reported in Tables 1 to 3.

| SAMPLE | MEDIUM |
|---|---|
| (A) | 0.3μ thick microporous a PTFE membrane |
| (B) | (A) laminated on one surface to a PTFE web having a weight of 3.5 g/ft$^2$ |
| (C) | (A) laminated on both surfaces to PTFE webs having a weight of 3.5 g/ft$^2$ |
| (D) | (A) laminated on one surface to a PTFE web having a weight of 7.5 g/ft$^2$ |
| (E) | (A) laminated on both surfaces to PTFE webs having a weight of 7.5 g/ft$^2$ |
| (F) | (A) laminated on one surface to a PTFE web having a weight of 3.5 g/ft$^2$ and on the other surface to a PTFE having a weight of 7.5 g/ft$^2$ |

In each of the webs employed in Samples (B) to (F), a mat of PTFE fibers was employed which included a FEP binder having a concentration of 45% by weight FEP, based on the total weight of PTFE fibers.

The results for tensile strength, burst strength, and air resistance are reported in Tables 1, 2 and 3, respectively.

TABLE 1

| | TENSILE STRENGTH | |
|---|---|---|
| Sample | @ 3% Elongation (lbs/linear inch) | Rupture (lbs/linear inch) |
| (A) | 0.1 | 1.4 |
| (B) | 1.0 | 3.9 |
| (C) | 2.3 | 8.5 |
| (D) | 1.7 | 4.3 |
| (E) | 2.8 | 8.8 |
| (F) | 1.9 | 6.2 |

TABLE 2

| Sample | Burst Strength (lbs/in²) | Thickness (mm) |
| --- | --- | --- |
| (A) | stretches | 1.9 |
| (B) | 16 | 6.5 |
| (C) | 26 | 13.2 |
| (D) | 18 | 10.7 |
| (E) | 33 | 17.0 |
| (F) | 26 | 15.2 |

TABLE 3

AIR RESISTANCE DATA

| Sample | Pressure Drop (inches Hg) | Gurley Seconds (100 cc/in²) |
| --- | --- | --- |
| (A) | 2.2 | 8.6 |
| (B) | 3.3 | 11.0 |
| (C) | 4.7 | 14.6 |
| (D) | 4.3 | 12.7 |
| (E) | 4.3 | 9.0 |
| (F) | 4.3 | 11.0 |

As may be noted from Tables 1 and 2, the media according to the present invention which include a web of microfibers substantially increase the strength of the media. The data presented in Table 3, indicates that with the improved strength and flexural modulus or handlability, there is an increase in pressure drop across the medium. However, the data in Table 3 shows that the sacrifice of pressure drop is relatively small in comparison to the improved strength characteristic.

I claim:

1. A composite, supported microporous medium comprising a microporous membrane having secured directly to at least one surface thereof a web of microfibers, each of said microporous membrane and said web of microfibers being formed from a polyperfluoroolefin.

2. The composite, supported microporous medium of claim 1 wherein said microporous membrane is formed from polytetrafluoroethylene.

3. The composite, supported microporous medium of claim 2 wherein said medium is free of adhesive components.

4. The composite, supported microporous medium of claim 1 wherein said microfibers are formed from polytetrafluorethylene.

5. The composite, supported microporous medium of claim 4 wherein said medium is free of adhesive components.

6. The composite, supported microporous medium of claim 1 wherein said web of microfibers comprise a mat of microfibers bound with a fluoropolymeric binder.

7. The composite, supported microporous medium of claim 6 wherein said binder comprises polyfluoroolefin.

8. The composite, supported microporous medium of claim 6 wherein each of said mat and binder comprise polyperfluoroolefin.

9. The composite, supported microporous medium of claim 6 wherein said mat of microfibers comprises PTFE.

10. The composite, supported microporous medium of claim 6 wherein said binder comprises FEP.

11. The composite, supported microporous medium of claim 6 wherein said microporous membrane comprises PTFE, said microfibers comprise PTFE and said fluoropolymeric binder comprises FEP.

12. The composite, supported microporous medium of claim 11 wherein said web of microfibers comprises a non-woven mat.

13. The composite, supported microporous medium of claim 12 wherein said medium is free of adhesive components.

14. The composite, supported microporous medium of claim 6 wherein a web of said microfibers is secured to both surfaces of said microporous membrane.

15. The composite, supported microporous medium according to claim 6 wherein said web of microfibers comprise a non-woven mat.

16. The composite, supported microporous medium of claim 6 wherein said medium is free of adhesive components.

17. The composite, supported microporous medium of claim 1 wherein said microporous membrane and said microfibers are formed from the same polyperfluoroolefin.

18. The composite, supported microporous medium of claim 1 wherein each of said microporous membrane and said microfibers are formed from polytetrafluoroethylene.

19. The composite, supported microporous medium of claim 1 wherein a web of said microfibers is secured to both surfaces of said microporous membrane.

20. The composite, supported microporous medium according to claim 1 wherein said web of microfibers comprise a non-woven mat.

21. The composite supported microporous medium according to claim 1 wherein said membrane is a non-woven membrane.

22. The composite, supported microporous medium of claim 1 wherein said web of microfibers comprises a non-woven mat of polytetrafluoroethylene fibers and said microporous membrane comprises a polytetrafluoroethylene membrane.

23. The composite, supported microporous medium of claim 22 wherein said medium is free of adhesive components.

24. The composite, supported microporous medium of claim 1 wherein said medium is free of adhesive components.

25. A method of preparing a composite, supported fluoropolymeric microporous medium comprising contacting at least one surface of a microporous membrane with a web of microfibers, each of said membrane and said web comprising a polyperfluoroolefin, and subjecting said microporous membrane and web of microfibers to sufficient heat and pressure to effect bonding therebetween.

26. A method according to claim 25 wherein said web of microfibers comprise a mat of microfibers bound with a fluoropolymeric binder.

27. A method of preparing a composite, supported fluoropolymeric medium according to claim 25 wherein both surfaces of said microporous membranes are contacted with said web of microfibers.

28. The method of preparing a composite, supported fluoropolymeric medium according to claim 25 wherein said web of microfibers comprise a non-woven mat.

29. The method of preparing a composite, supported fluoropolymeric medium according to claim 25 wherein said membrane is a non-woven membrane.

30. A method according to claim 16 wherein said microporous membrane and said web of microfibers are heated to a temperature of about 400° to 700° F.

31. A method according to claim 25 wherein said microporous membrane and said web of microfibers are heated to a temperature of about 450° to 550° F.

32. A method according to claim 25 wherein said pressure is about 5 to about 80 pounds.

33. A method according to claim 25 wherein said microporous membrane is a polytetrafluoroethylene membrane.

34. A method according to claim 25 wherein said web of microfibers comprise a web of polytetrafluoroethylene microfibers.

35. A method according to claim 25 wherein said microporous membrane and said web of microfibers each comprise polytetrafluoroethylene.

36. A method of separating a particulate material from a particulate-containing fluid comprising contacting a composite, supported microporous medium which includes a microporous membrane having secured directly to at least one surface thereof a web of microfibers, each of said membrane and said web comprising a polyperfluoroolefin, with a particulate-containing fluid and separating said fluid into particulate and a filtrate.

37. The method according to claim 36 wherein said particulate is an analyte which is further tested after separation from said filtrate.

* * * * *